(12) United States Patent  
Koivisto et al.

(10) Patent No.: US 9,078,250 B2  
(45) Date of Patent: Jul. 7, 2015

(54) METHOD AND APPARATUS IMPLEMENTING CHANNEL QUALITY CONTROL

(71) Applicant: Broadcom Corporation, Irvine, CA (US)

(72) Inventors: Tommi Koivisto, Espoo (FI); Timo Roman, Espoo (FI); Mihai Enescu, Espoo (FI)

(73) Assignee: BROADCOM CORPORATION, Irvine, CA (US)

( * ) Notice: Subject to any disclaimer, the term of this patent is extended or adjusted under 35 U.S.C. 154(b) by 107 days.

(21) Appl. No.: 13/752,656

(22) Filed: Jan. 29, 2013

(65) Prior Publication Data

US 2013/0195047 A1 Aug. 1, 2013

(30) Foreign Application Priority Data

Jan. 30, 2012 (GB) .................................. 1201618.4

(51) Int. Cl.
- *H04W 72/04* (2009.01)
- *H04L 1/00* (2006.01)
- *H04L 1/16* (2006.01)
- *H04L 1/06* (2006.01)
- *H04L 1/18* (2006.01)

(52) U.S. Cl.
CPC ......... *H04W 72/0406* (2013.01); *H04L 1/0061* (2013.01); *H04L 1/0073* (2013.01); *H04L 1/1614* (2013.01); *H04L 1/0067* (2013.01); *H04L 1/0606* (2013.01); *H04L 1/1812* (2013.01); *H04L 2001/0093* (2013.01)

(58) Field of Classification Search
CPC .......................... H04W 72/0406; H04L 1/0073

USPC .......................................................... 370/329
See application file for complete search history.

(56) References Cited

U.S. PATENT DOCUMENTS

| | | | |
|---|---|---|---|
| 2008/0293424 A1 | 11/2008 | Cho et al. | |
| 2009/0046793 A1 | 2/2009 | Love et al. | |
| 2009/0238160 A1 | 9/2009 | Bhatti et al. | |
| 2010/0272048 A1* | 10/2010 | Pan et al. .................. | 370/329 |
| 2011/0292902 A1* | 12/2011 | Yang et al. ................ | 370/329 |
| 2012/0039291 A1* | 2/2012 | Kwon et al. .............. | 370/329 |
| 2012/0087349 A1* | 4/2012 | Zhu ............................ | 370/336 |

OTHER PUBLICATIONS

UKIPO Search Report under Section 17 compiled May 22, 2012 which is issued in a related British Application No. GB1201618.4 (1 page).

* cited by examiner

*Primary Examiner* — Albert T Chou  
(74) *Attorney, Agent, or Firm* — Foley & Lardner LLP; Christopher J. McKenna; Paul M. H. Pua

(57) ABSTRACT

Methods for devices, devices and computer program products for devices relate to a communication module, arranged for packet based communication, and including a receiving module. The receiving module is arranged to receive a control message, wherein the control message includes a plurality of acknowledgement information items, wherein each of the plurality of acknowledgement information items are located in a preset portion of the control message, respectively. The device further includes a determination module, arranged to determine whether the received control message is intended for the device, a selection module, arranged to select, responsive to an affirmative determination result, at least one of the plurality of acknowledgement information items based on the preset portions, and an obtaining module, arranged to obtain control data contained in the selected at least one of the plurality of acknowledgement information items.

24 Claims, 8 Drawing Sheets

METHOD AND APPARATUS IMPLEMENTING CHANNEL QUALITY CONTROL

This application claims the benefit of foreign priority under 35 U.S.C. §119 and 37 CFR §1.55 to U.K. Patent Application No. 1201618.4, filed on Jan. 30, 2012, the entire content of which is incorporated herein by reference.

FIELD OF THE INVENTION

The present invention generally relates to effective transmission of multiple transmission acknowledgement items between a plurality of nodes in a communication system. More specifically, the present invention relates to methods and devices configured to merge multiple transmission acknowledgement items and to communicate demerging information in a packet based communication system.

BACKGROUND INFORMATION

In order to provide efficient data transmission in Long Term Evolution (LTE) system, downlink control channel known as physical downlink control channel (PDCCH) is provided. A PDCCH carries a message known as downlink control information (DCI), which includes transmission resource assignments and other control information for a user equipment (UE) or group of UEs.

In LTE Rel-8/9/10, downlink control channels comprise physical control format indicator channel (PCFICH), physical downlink control channel (PDCCH) and physical HARQ indicator channel (PHICH). Current downlink control signaling is based on common reference signals (CRS) which are not precoded and are broadcast all over the cell. When multiple antennas are in use, transmit diversity is used by means of space-frequency bock code (SFBC) in case of 2 transmit antennas and space-frequency block code-frequency switched transmit diversity (SFBC-FSTD) in case of 4 transmit antennas. The mapping of the control channels to resource elements (REs) is fixed and based on the cell identifier (ID). Downlink control channels are mapped to REs over the full frequency band of the system in a so-called "control channel region" the width of which in number of orthogonal frequency division multiplexing (OFDIM) symbols from the start of the LTE subframe is indicated by PCFICH. The PHICH channel carries acknowledgement/negative-acknowledgement (ACK/NACK) indications in support of uplink (UL) synchronous hybrid automatic repeat request (HARQ) operation.

LTE Rel-8/9/10 uses a hybrid HARQ scheme for error correction in addition to forward error correction (FEC) with channel coding. Uplink transmission operates along synchronous HARQ, meaning that occurrence for retransmission for a given HARQ process happen at predefined time instances. In response to a correctly and incorrectly, respectively, received uplink transmission from the UE, the evolved NodeB (eNB) sends an ACK and a NACK, respectively, to the UE in the form of a HARQ indicator codeword transmitted over the PHICH. HARQ indicator for a given HARQ process and codeword is either set to 0 (NACK) or 1 (ACK). It is then channel-coded with repetition coding to a set of three bits (that is "000" or "111") to form a HARQ indicator codeword which undergoes BPSK modulation, scrambling, layer mapping, precoding and resource mapping as shown in FIG. 1.

Such modulation and scrambling is implemented as follows:

$$d(i) = w(i \cdot \mathrm{mod} N_{SF}^{PHICH}) \times (1 - 2c(i)) \times z\left(\left\lfloor \frac{i}{N_{SF}^{PHICH}} \right\rfloor\right)$$

with $w(i \cdot \mathrm{mod}\, N_{SF}^{PHICH})$ as the orthogonal sequence symbol with index $n_{PHICH}^{seq}$ $(1-2c(i))$ as the cell specific scrambling sequence symbol, and $$z\left(\left\lfloor \frac{i}{N_{SF}^{PHICH}} \right\rfloor\right)$$

as the modulated HARQ indicator symbol.

A further illustration of the modulation and scrambling is shown in FIG. 2.

Multiple PHICHs are mapped to the same set of REs via the use of orthogonal spreading sequences in order to constitute a PHICH group. Elements of PHICH sequences are summed to create the sequence of the corresponding PHICH groups, which is shown in FIG. 3. Spreading sequences are either all real- or all complex-valued orthogonal sequences of length-4 for normal cyclic prefix (CP) and length-2 for extended CP. Cell-specific scrambling is applied in order to mitigate inter-cell interference. A PHICH resource occupies twelve REs for normal CP and six REs for extended CP. PHICH REs are aligned and mapped to resource element groups (REG) which consist of four consecutive REs in frequency domain, each containing one complex scrambled symbol.

Complex symbols are mapped to one, two or four layers which are then correspondingly precoded over antenna ports with respectively single antenna port transmission, two antenna port SFBC transmit diversity or four antenna port SFBC-FSTD transmit diversity. The number of OFDM symbols used for PHICH mapping is configurable by the PHICH duration, which is either normal (OFDM symbol 0 in the subframe) or extended (OFDM symbols 0, 1, 2 in general except for in time division duplex (TDD), where subframes 1 and 6 are used, or in multimedia broadcast single frequency network (MBSFN) subframes, where OFDM symbols 0 and 1 are used). Mapping of PHICH to OFDM symbols is illustrated in FIG. 4.

A PHICH resource is identified by its group index and sequence index, which are linked to the uplink demodulation reference signal (DMRS) cyclic shift.

The PHICH resource is identified by the index pair $(n_{PHICH}^{group}, n_{PHICH}^{seq})$ where $n_{PHICH}^{group}$ is the PHICH group number and $n_{PHICH}^{seq}$ is the orthogonal sequence index within the group as defined by:

$$n_{PHICH}^{group} = (I_{PRB\_RA} + n_{DMRS}) \mathrm{mod}\, N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \mathrm{mod}\, 2N_{SF}^{PHICH}$$

where $n_{DMRS}$ is determined by use of the following mapping table the information known from the "cyclic shift for DM RS"-field in the most recent PDCCH with uplink DCI format for the transport block(s) associated with the corresponding PUSCH transmission:

| "cyclic shift for DM RS"-field in the PDCCH with the uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

$n_{DMRS}$ shall be set to zero
- if there is no PDCCH with uplink DCI format for the same transport block, and
- if the initial PUSCH for the same transport block is semi-persistently scheduled, or
- if the initial PUSCH for the same transport block is scheduled by the random access response grant.

$N_{SF}^{PHICH}$ is the spreading factor size used for PHICH modulation, $$I_{PRB\_RA} = \begin{cases} I_{PRB\_RA}^{lowest\_index} & \text{for the first } TB \text{ of a } PUSCH \text{ with associated } PDCCH \text{ or for the case of no associated } PDCCH \text{ when the number of negatively acknowledged } TBs \text{ is not equal to the number of } TBs \text{ indicated in the most recent } PDCCH \text{ associated with the corresponding } PUSCH \\ I_{PRB\_RA}^{lowest\_index} + 1 & \text{for a second } TB \text{ of a } PUSCH \text{ with associated } PDCCH \end{cases}$$

where
$I_{PRB\_RA}^{lowest\_index}$ is the lowest PRB index in the first slot of the corresponding PUSCH transmission,
$N_{PHICH}^{group}$ is the number of PHICH groups configured by higher layers, and $$I_{PHICH} = \begin{cases} 1 & \text{for } TDD \ UL/DL \text{ configuration } 0 \text{ with } PUSCH \text{ transmission in subframe } n = 4 \text{ or } 9 \\ 0 & \text{otherwise} \end{cases}$$

In LTE frequency division duplex (FDD), the number of PHICH groups is constant in all subframes and is configured via higher layer signaling. In LTE TDD, the number of PHICH groups depends additionally on the subframe number and uplink/downlink TDD configuration.

In continuation of the LTE concept, in a planned release an enhanced physical downlink control channel (E-PDCCH) will resemble the control channel specified in Release 10 for relay nodes, R-PDCCH, in the sense that it will be based on UE-specific reference signals (UE-RS) and be mapped to the PDSCH region of the subframe. E-PDCCH is expected to have support for closed-loop (precoded) spatial multiplexing (at least for rank-1) as well as multi-user (MU) multiple-input multiple-output (MIMO) or coordinated multi-point transmission (CoMP) and/or (in contrast to R-PDCCH) for multiplexing of DCIs to several UEs within one PRB pair. It is noted that the definition of UE-specific RS hints that they are to be used by a single UE, however in principle nothing forbids the eNB to configure multiple UEs with the same RS in which case also UE-specific RS could be in fact shared by multiple UEs.

Currently, 3rd Generation Partnership Project (3GPP) RAN1 is working on the next release of the LTE specifications, i.e. Release 11. Downlink control signaling enhancements were first investigated as part of the study items on downlink MIMO enhancements and CoMP. During development, a new Rel-11 work item on introducing a new downlink control channel was approved. The goal of such new downlink control channel is to specify (an) enhanced physical downlink control channel(s) that is/are able to operate on legacy carriers and on a new carrier type (as planned on carrier aggregation (CA) enhancements for LTE). The enhanced physical downlink control channel(s) shall be able to support increased control channel capacity, to support frequency domain inter-cell interference coordination (ICIC), to achieve improved spatial reuse of control channel resource, to support beamforming and/or diversity, to operate on the new carrier type and in MBSFN subframes, whereby ability to operate in non-MBSFN subframes is also assumed, and to coexist on the same carrier as legacy UEs. It is also desirable for the enhanced physical downlink control channel to be able to be scheduled frequency-selectively, and to be able to mitigate inter-cell interference.

SUMMARY

Various aspects of examples of the invention are set out in the claims.

According to a first aspect of the present invention, there is provided a device Including:
- a communication module, arranged for packet based communication, and comprising a receiving module, wherein said receiving module is arranged to receive a control message, wherein said control message includes a plurality of acknowledgement information items, each of said plurality of acknowledgement information items being located in a preset portion of said control message, respectively,
- a determination module, arranged to determine whether said received control message is intended for said device,
- a selection module, arranged to select, responsive to affirmative determination result, at least one of said plurality of acknowledgement information items, and
- an obtaining module, arranged to obtain control data contained in said selected at least one of said plurality of acknowledgement information items.

According to a second aspect of the present invention, there is provided a device including:
- a communication module, arranged for packet based communication, and comprising a transmission module, wherein said transmission module is arranged to transmit a control message, wherein said control message includes a plurality of acknowledgement information items, each of said plurality of acknowledgement information items being located in a preset portion of said control message, respectively.

According to a third aspect of the present invention, there is provided a method for a device including a communication module, arranged for packet based communication, said method comprising the steps of:

receiving a control message, wherein said control message includes a plurality of acknowledgement information items, each of said plurality of acknowledgement information items being located in a preset portion of said control message, respectively, determining whether said received control message is intended for said device, selecting, responsive to affirmative result of determining, at least one of said plurality of acknowledgement information items, and obtaining control data contained in said selected at least one of said plurality of acknowledgement information items.

According to a fourth aspect of the present invention, there is provided a method for a device including a communication module, arranged for packet based communication, said method including the steps of:

transmitting a control message, wherein said control message includes a plurality of acknowledgement information items, each of said plurality of acknowledgement information items being located in a preset portion of said control message, respectively.

According to a fifth aspect of the present invention, there is provided a computer program product for a device including a communication module, arranged for packet based communication, said computer program product including computer-executable components which, when executed on a computer, are configured:

to receive a control message, wherein said control message includes a plurality of acknowledgement information items, each of said plurality of acknowledgement information items being located in a preset portion of said control message, respectively, to determine whether said received control message is intended for said device, to select, responsive to affirmative determination result, at least one of said plurality of acknowledgement information items, and to obtain control data contained in said selected at least one of said plurality of acknowledgement information items.

According to a sixth aspect of the present invention, there is provided a computer program product for a device including a communication module, arranged for packet based communication, said computer program product including computer-executable components which, when executed on a computer, are configured:

to transmit a control message, wherein said control message includes a plurality of acknowledgement information items, each of said plurality of acknowledgement information items being located in a preset portion of said control message, respectively.

Respective advantageous further developments of the method and/or device are as set out in the corresponding dependent claims.

The above computer program products may be embodied as a (volatile or non-volatile) computer-readable storage medium.

The methods, devices and computer program products described in this document, at least in exemplary embodiments, are able to implement a control channel providing the possibility of a transmission of multiple transmission acknowledgement information items intended for a plurality of receiving elements within a single downlink control information. An acknowledgement information item includes information as to whether a transport block of a PUSCH transmission is successfully received by a receiving element. If such transport block is successfully received, the acknowledgement information item includes positive acknowledgement information. If such transport block is not successfully received, the acknowledgement information item includes negative acknowledgement information. Thus, information included in each of said acknowledgement information items indicate success of a corresponding transport block of a PUSCH transmission, that is, whether such transport block is successfully received, or whether such transport block is not successfully received.

BRIEF DESCRIPTIONS OF DRAWINGS

For a more complete understanding of example embodiments of the present invention, reference is now made to the following descriptions taken in connection with the accompanying drawings in which.

DETAILED DESCRIPTION

Figure 1:
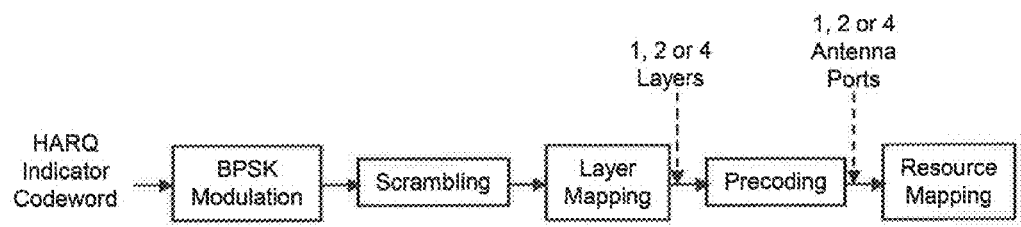
FIG. 1 is a flow chart illustrating steps contained in a PHICH transmission chain according to former releases 8/9/10 of LTE standard.
Figure 2:
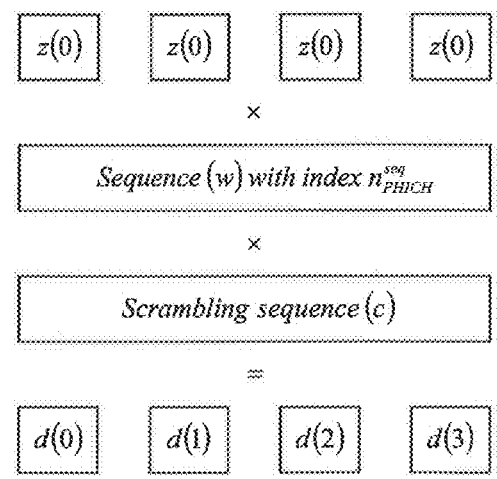
FIG. 2 shows a determination of PHICH modulation and scrambling according to former releases 8/9/10 of LTE standard.
Figure 3:
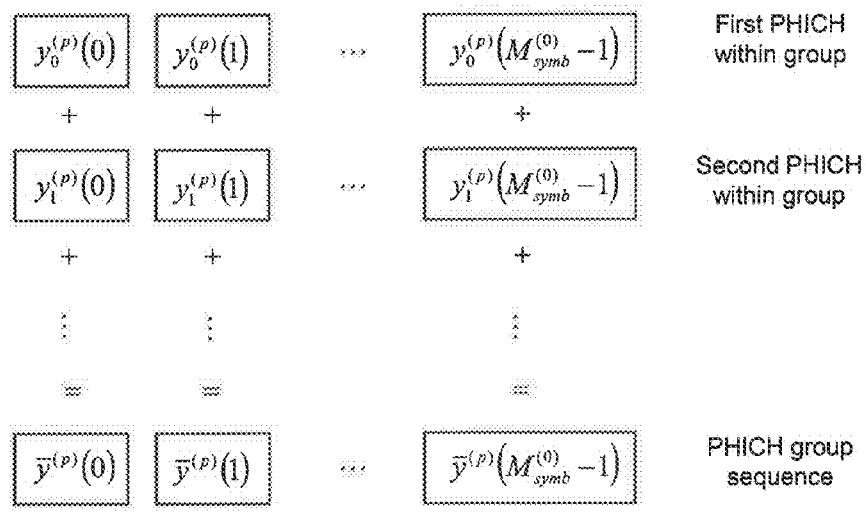
FIG. 3 shows summation of PHICH sequences to form a PHICH group according to former releases 8/9/10 of LTE standard.
Figure 4:
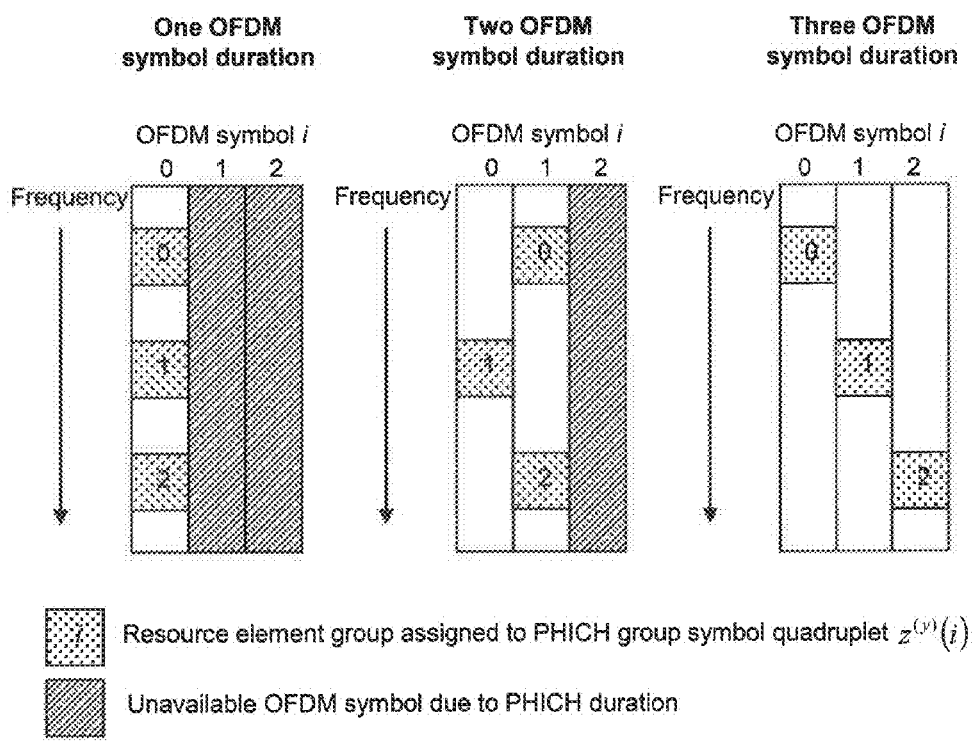
FIG. 4 shows mapping of PHICH to OFDM symbols according to former releases 8/9/10 of LTE standard.

Exemplary aspects of the invention will be described herein below.

As initial point for the inventors, downlink control channel enhancements in Rel-11 are to be understood in the broad sense and may apply to any one of PCFICH, PDCCH, PHICH channels, whereby merely the introduction of an E-PDCCH is agreed for Rel-11.

Below are restrictions of the legacy PHICH listed, which, among others, establish the necessity of also introducing E-PHICH:

A spatial reuse of PHICH is not always possible, e.g. in a downlink CoMP scenario. Further, in later releases of LTE, frequency domain ICIC capability is needed, which cannot be provided by legacy PHICH.

In addition, the use of UE-RS, asked for the E-PDCCH, brings beamforming gain as well as the possibility of MU-MIMO transmission.

Further, extension carriers which may be introduced in LIE Rel-11 as part of CA enhancements will not bear any Rel-8/9/10 downlink control region, thus enhanced control channels including E-PHICH are needed from this perspective. In case Rel-11 builds upon the same principles of synchronous HARQ operation for uplink as in Rel-8/9/10, E-PHICH channel is needed, although implicit ACK/NACK signaling via an uplink scheduling grant is a known solution to circumvent the need of explicit ACK/NACK signaling.

Furthermore, possible future classes of machine type communication (MTC) terminals are expected to have narrowband processing capability. Hence existing PHICH with resource mapping over the whole system bandwidth may not be applicable.

Based on the restrictions of legacy PHICH and on the expected course of development with respect to LTE-Rel 11 and further releases and considering, that neither the introduction of E-PHICH nor its potential physical layer design for E-PHICH is decided, numerous technical issues to be solved are identified:

Special observation is to be taken to resource allocation and multiplexing. E-PHICH resources will occupy physical download shared channel (PDSCH) region within the PRB, with the possibility of PDSCH being mapped from the first OFDM symbol in the subframe onwards (i.e. no Rel-8/9/10 legacy downlink control region). The main difficulty here is that the current LTE Rel-10 resource grid (i.e. time-frequency RE positions within a subframe) is extremely crowded due to the presence of numerous channels and signals, e.g. PDSCH, variable legacy Rel-8/9/10 downlink control region, CRS for 1/2/4 antenna ports, channel state information reference signal (CSI-RS) for 1/2/4/8 ports, an RE muting. The situation is even more complex on TDD side with different downlink pilot timeslot (DwPTS) sizes, while it is equally complex if extended CP is considered. It is commonly understood that E-PDCCH will be transmitted on a set of PRBs, e.g. configured via higher layer signaling, and that PDSCH transmission, if any, will be rate-matched around E-PDCCH. Rate-matching of PDSCH around E-PHICH is rather likely, but it is not clear whether E-PHICH will be allocated separate dedicated REs or will reside within resources reserved for E-PDCCH. Rate-matching of E-PDCCH around E-PHICH complicates further E-PDCCH design because it introduces uneven sizes for control channel elements (CCE) in addition to previously listed constraints to resource allocation.

Further, inter cell interference coordination is an important aspect to consider as legacy PHICH proved to be one of the bottleneck of Rel-10 enhanced inter cell interference coordination (eICIC), because it collides head-to-head with other cells' control channels due to full frequency band allocation. Since E-PHICH will likely reside together with E-PDCCH in dedicated PRBs, ICIC is possible to large extent through frequency domain multiplexing (FDM) of E-PDCCH and E-PHICH in different PRBs for co-channel interfering network nodes (eNBs). If feasible, it would be even more beneficial to randomize E-PHICH RE locations within PRBs transmitting enhanced downlink control information.

Furthermore, reference signal provisioning is to be considered. PHICH demodulation relies on cell specific CRS which are not precoded and broadcast over the cell. E-PHICH is envisioned to operate over UE-specific or dedicated reference symbols which may be either precoded or not. Because of RS overhead constraints, additional UE implementation complexity (new channel estimation filter required) as well as standardization effort, it is highly likely that E-PHICH, if introduced, will operate along the same set of UE-RS as E-PDCCH, i.e. Rel-10 DM-RS.

Legacy PHICH design allows power boosting on a per-UE basis. Power boosting is important and necessary to reach UEs under poor radio conditions. However, one should keep in mind that the use of UE-specific RS can bring precoding gain if these are precoded.

Special observation is to be taken to control of overhead. E-PHICH overhead should be kept under control. If one follows legacy PHICH design, PHICH incurs overhead in every downlink subframe since resources are reserved regardless of whether ACK(s)/NACK(s) need to be transmitted or not. It would hence be desirable if E-PHICH overhead could scale to some extent at least with the instantaneous ACK/NACK load.

In addition, diversity or localized transmission is to be considered. PHICH demodulation relies on cell specific CRS which are not precoded and broadcast over the cell. Resource allocation is distributed throughout the frequency band in the form of three REGs which together with multi-antenna transmit diversity techniques brings frequency diversity and spatial diversity gain. It is agreed in RAN1 that "both localised and distributed transmission of the enhanced control channel are supported". Distributed transmission of E-PHICH seems to be needed as it allows covering the whole cell, supports mobility, allows fallback operation and DM-RS support can be shared together with distributed E-PDCCH. It is proposed to consider E-PHICH design jointly with diversity transmission of E-PDCCH. However, localized PHICH can also be treated as being needed. Beamforming gains are present with localized allocation and precoded DM-RS, but distributed PHICH allocation is likely needed as fallback and moreover localized E-PHICH allocation requires "grouping several UEs under the same beams" (i.e. DM-RS ports) to stay efficient with respect to DM-RS resource utilization.

Considering the demonstrated points, a decision whether and in which extend legacy PHICH design components are to be reused. Considered from the standpoint of a continued standard, reuse legacy PHICH design components as much as possible is desirable to save both standardization time and implementation effort. However, the biggest restraint seems to be provided by the consideration of resource allocation as well as overhead issues in view of reusing legacy PHICH design components. Also, current PHICH design paradigm does not lend itself easily to localized design because it would incur excessive DM-RS overhead.

Hence the above issues call for novel solutions for E-PHICH design since it proves that strictly following and extending principles of legacy PHICH to E-PHICH does not fully satisfy design constraints set for enhanced downlink control channel design for LTE Rel-11 and beyond.

To sum up the above, it is aimed for an enhanced physical downlink control channel that is able to support increased control channel capacity, frequency-domain ICIC, beamforming and/or diversity, to achieve improved spatial reuse of control channel resource, to operate on the new carrier type and in MBSFN subframes, and to coexist on the same carrier as legacy UEs.

Desirably, the enhanced physical downlink control channel is able to be scheduled frequency-selectively, and to mitigate inter-cell interference.

Thereby, a framework is recognizable, which provides that both, localised and distributed transmissions of the enhanced control channel are supported. Further, at least for localised transmission, and for distributed transmission where, CRS is not used for demodulation of the enhanced control channel, the demodulation of the enhanced control channel is based on DMRS transmitted in the PRB(s) used for transmission of the enhanced control channel. In addition, antenna ports 7-10 is/are to be used. A scrambling sequence to be used is not set.

It is assumed, that there are no cases where CRS is used for demodulation of the enhanced control channel.

Considering the above illustrated thoughts, an approach for E-PHICH is described in the following.

The present invention relates in particular but without limitation to mobile communications. It is to be noted that the following exemplary description refers to an environment of the Long Term Evolution-Advanced (LTE-A) system in which packet based transmission and channel quality control by means of packet-based acknowledgement information is deployed. Specifically, the present invention relates to novel solutions for E-PHICH design for LTE Rel-11 and beyond. However, it is to be understood that this serves for explanatory purposes only. Other system differing from the LTE-A system can be adopted as long as they deploy packet based transmission and channel quality control by means of packet-based acknowledgement information.

In such mobile communication system one or more UEs are communicating with at least one eNB. Such eNB is able to schedule the communication with each of the UEs, that is, transmission resources in both directions are allocated by the eNB. In LTE, a retransmission protocol known as HARQ is used. For each received (payload) data packet, the receiver transmits acknowledgement information. If the packet is received correctly, the receiver transmits acknowledgement (ACK) information, whereby on receiving of incorrectly received packets negative acknowledgement (NACK) information is transmitted. When the receiver has transmitted a NACK information, the transmitter retransmits the related (payload) data packet.

According to an aspect of the present invention, E-PHICH is specified as a new type of physical channel for transmitting ACK/NACK in support of uplink (synchronous) HARQ operation such that E-PHICH is conveyed in the form of one or multiple DCI formats transmitted within E-PDCCH search space.

In particular, the proposed design is such that HARQ indications (ACK/NACK) for given set of UEs are pipelined into a new DCI format. Such new DCI format may for instance follow the principles of e.g. DCI Format 3/3A used for uplink transmit power control (TPC) commands where an index or indices provided by higher layers determines the index to the ACK/NACK bit(s) for given UE and given transport block(s) (codeword(s)) for this UE.

DCI format 3 is used for the transmission of TPC commands for PUCCH and PUSCH with 2-bit power adjustments. The following information is transmitted by means of the DCI format 3:

"TPC command number 1, TPC command number 2, . . . , TPC command number N"

where $$N = \left\lfloor \frac{L_{format\,0}}{2} \right\rfloor,$$

and $L_{format}$ 0 is equal to the payload size of format 0 before CRC attachment when format 0 is mapped onto the common search space, including any padding bits appended to format 0. The parameter tpc-Index provided by higher layers determines the index to the TPC command for a given UE.

If $$\left\lfloor \frac{L_{format\,0}}{2} \right\rfloor < \frac{L_{format\,0}}{2},$$

a bit of value zero shall be appended to format 3.

DCI format 3A is used for the transmission of TPC commands for PUCCH and PUSCH with single bit power adjustments. The following information is transmitted by means of the DCI format 3A:

"TPC command number 1, TPC command number 2, . . . , TPC command number M"

where $M = L_{format\,0}$, and $L_{format\,0}$, is equal to the payload size of format 0 before CRC attachment when format 0 is mapped onto the common search space, including any padding bits appended to format 0. The parameter tpc-Index provided by higher layers determines the index to the TPC command for a given UE.

Further, in the proposed design of E-PHICH, the DCI format(s) carrying E-PHICH is (are) scheduled in the common search space of E-PDCCH. Thereby, cyclic redundancy check (CRC) is scrambled with one or multiple E-PHICH radio network temporary identifier(s) (E-PHICH-RNTI(s)) depending on whether one or multiple DCI formats are used. Furthermore the E-PHICHs may be grouped, and each group is allocated with its own E-PHICH-RNTI that is signaled to the UE via higher layers.

The proposed DCI and the E-PHICH according to the invention are designed, such that, for example, the size of the DCI format(s) carrying E-PHICH matches one or more of existing DCI formats in order to keep blind decoding complexity under control at the UE. It is noted that, as another example, the proposed DCI size for E-PHICH may not necessarily need to match the size of one or more DCI formats. Further, E-PHICH DCI can be transmitted using one or more aggregation levels. In addition, E-PHICH DCI is not necessarily scheduled in given subframe, for instance if there is no ACK/NACK to transmit for the pool of UEs it covers or in case there are too few ACK/NACKs and usage of dedicated UL grants would incur less overhead than a broadcast E-PHICH DCI.

According to the present invention, E-PHICH is transmitted in so-called distributed mode, which provides good cell coverage and support for UE mobility. In such case, it can be transmitted jointly with distributed transmission of E-PDCCH in the sense that is scheduled within REs in PRBs reserved for distributed mode of E-PDCCH. Further, associated DM-RS port(s) for demodulation are the same as those configured for E-PDCCH for distributed mode.

According to the present invention, E-PHICH may further be transmitted in localized mode, which provides beamforming gain and has potential for MU-MIMO scheduling. In such case, it can be transmitted jointly with localized transmission of E-PDCCH in the sense that is scheduled within REs in PRBs reserved for localized mode E-PDCCH. Furthermore, associated DM-RS port(s) for demodulation are the same as those configured for E-PDCCH for localized mode for a particular UE. Since E-PHICH is a broadcast format, transmission in localized mode requires grouping UEs under common beams to be efficient in terms of DM-RS resource utilization.

Figure 5:
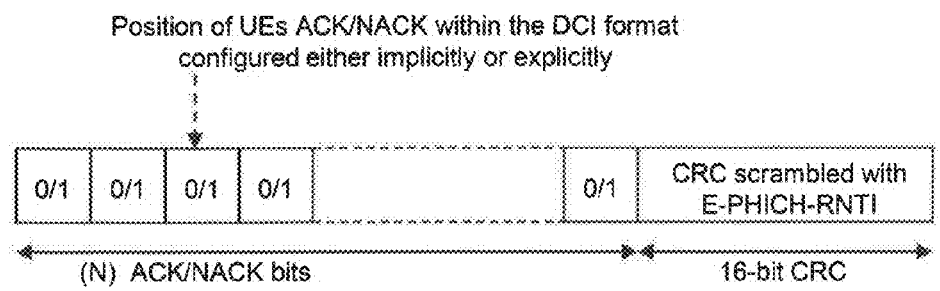
FIG. 5 shows an exemplary DCI format according to one aspect of the invention.

FIG. 5 illustrates the DCI format conveying ACK/NACK bits according to an aspect of the invention. There are N ACK/NACK bits carried within the DCI, where N is chosen such that the DCI format size matches either with size of DCI format 1A/0 or with DCI format 1C in order not to increase the number of blind decoding attempts. A CRC calculated over the payload bits is appended to the end of the DCI format. After that, the CRC is further scrambled (e.g. a logical XOR operation) with the E-PHICH-RNTI configured to the UE.

According to one example of the present invention, the bit position(s) of the ACK/NACK(s) intended for a specific UE are configured explicitly via higher layer signaling. In another example according to the present invention, the bit position(s) of the ACK/NACK(s) intended for a specific UE are configured implicitly by mapping the bit position e.g. to the information carried in the corresponding uplink grant. For example, similar implicit resource mapping mechanisms as in Release 8 PHICH can be used i.e. mapping the bit position to the first PRB allocated in uplink for PUSCH and/or the DM RS cyclic shift allocated for the PUSCH transmission.

Figure 6:
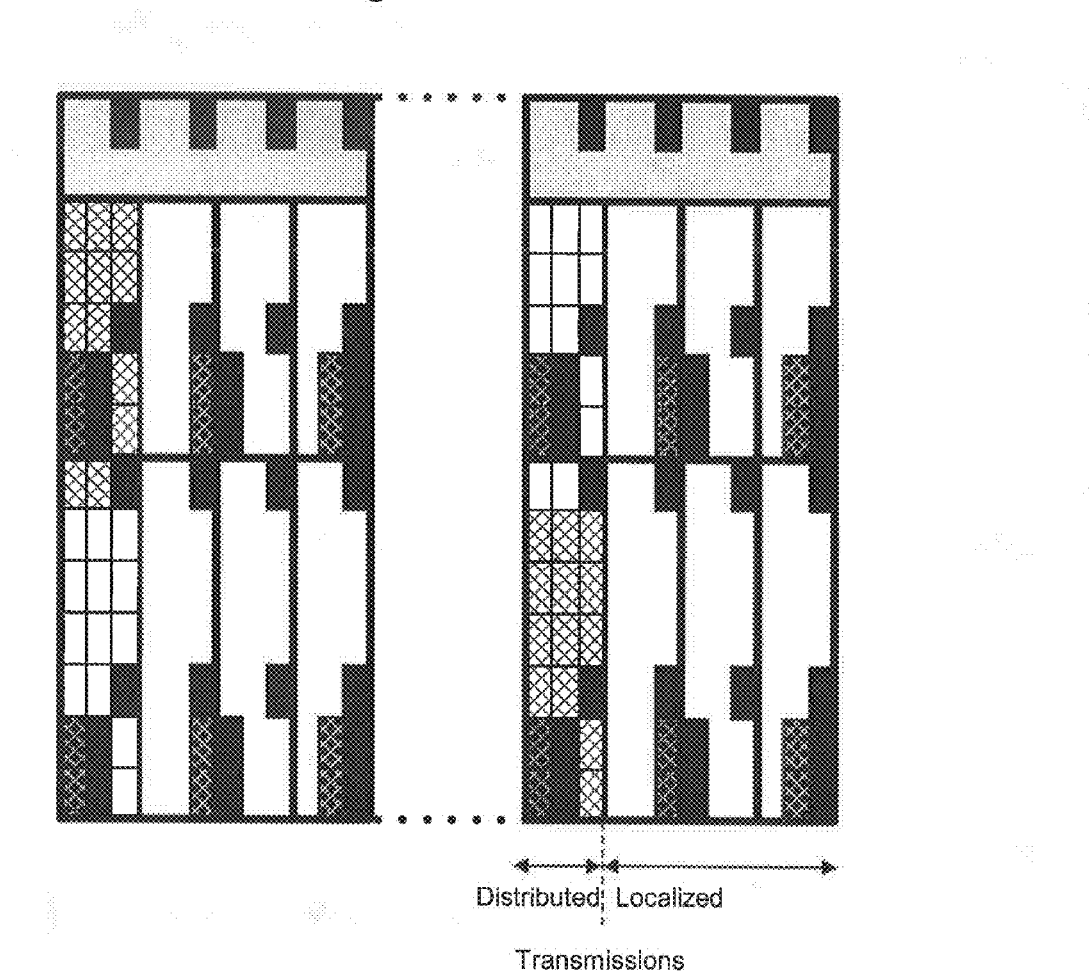
FIG. 6 shows an exemplary mapping of a DCI format in localized mode and distributed mode according to one aspect of the invention.

FIG. 6 illustrates the localized and distributed transmission options. In localized transmission, the DCI format is mapped as a whole continuously to the same PRB (or multiple PRBs in case of high aggregation levels requiring multiple PRBs). In case of distributed transmission, the DCI format is split into multiple pieces after channel coding, and each piece is transmitted within one PRB. The PRBs allocated for distributed transmission of E-PDCCH are typically non-contiguously allocated in frequency domain in order to ensure sufficient frequency diversity, but it is also noted that nothing precludes them being allocated contiguously.

Summarizing, according to the present invention, a new physical channel—an enhanced physical HARQ indicator channel (E-PHICH)—for transmitting the acknowledgment information is proposed. However, the invention as described below is not limited to such E-PHICH.

In the following, a plurality of UEs serves as the transmitters of the (payload) data (uplink), whereas an eNB serves as the receiver. However, the following described functionality may also be implemented on the converse device, respectively.

It is now more specifically referred to the drawings and exemplary embodiments illustrated therein.

It will be understood from the following description, that if desired, the different functions discussed herein may be performed in a different order and/or concurrently with each other. Furthermore, if desired, one or more of the above-described functions may be optional or may be combined.

Figure 7:
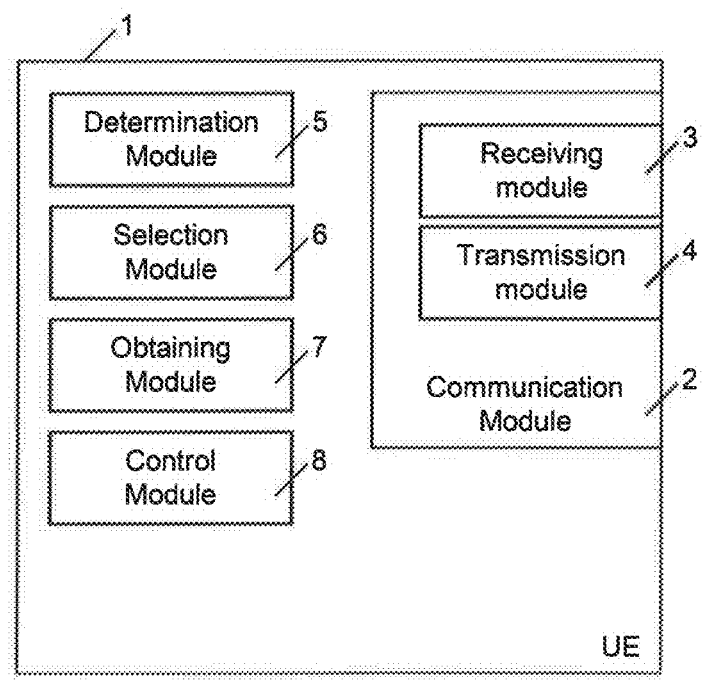
FIG. 7 shows a block diagram of an exemplary User Equipment, UE, according to one aspect of the invention.

FIG. 7 illustrates a block diagram of an exemplary User Equipment, UE, according to one aspect of the invention. Said UE (1) comprises a communication module (2) which is arranged for packet based communication. Said communication module (2) comprises a receiving module (3), which is arranged to receive at least a control message. The UE (1) further comprises a determination module (5), which is arranged to determine whether said received control message is intended for said device a selection module (6), which is arranged to select acknowledgement information items, and an obtaining module (7), which is arranged to obtain control data contained in said selected acknowledgement information items.

The communication module (2) of the UE as shown in FIG. 7 further comprises a transmission module (4), which is arranged to perform at least payload transmissions. The UE(1) as shown in FIG. 7 further comprises a control module (8), which is arranged at least to decide whether said payload transmission succeeded based on corresponding control data contained in said selected acknowledgement information items, and to control responsive to negative decision result, re-transmission of said payload transmission.

Figure 8:
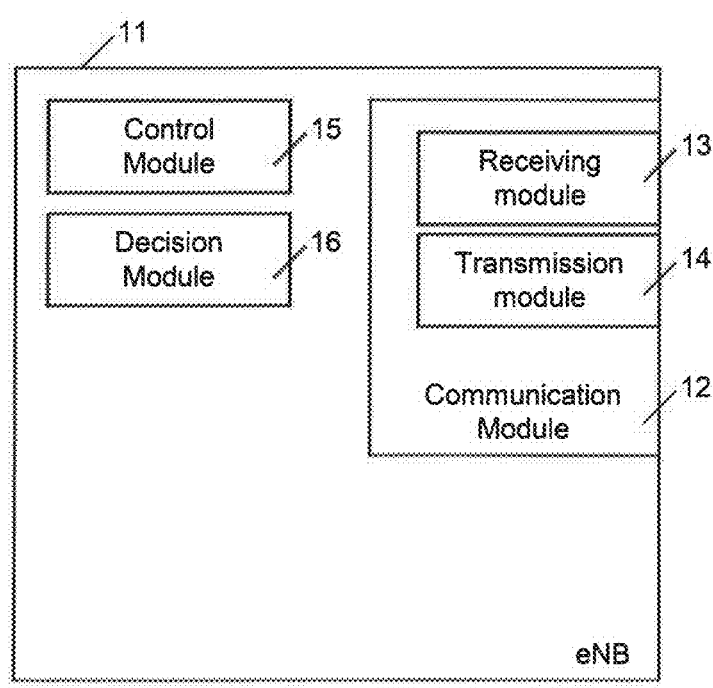
FIG. 8 shows a block diagram of an exemplary evolved Node B, eNodeB, according to one aspect of the invention.

FIG. 8 illustrates a block diagram of an exemplary evolved Node B, eNB, according to one aspect of the invention. Said eNB (11) comprises a communication module (12), which is arranged for packet based communication, and which comprises a transmission module (14). The transmission module (14) of the eNB (11) as shown in FIG. 8 is arranged to transmit at least a control message.

The communication module (12) of the eNB (11) as shown in FIG. 8 further comprises a receiving module, which is arranged to receive at least a plurality of payload transmissions, which may be transmitted from one or from a plurality of transmitting devices such as the UE (1) as shown in FIG. 7.

The eNB (11) as shown in FIG. 8 further comprises a control module (15), which is arranged to scramble at least a portion of said control message, and a decision module (16), arranged to at least decode said plurality of received payload transmissions, decide whether decoding succeeded, and set control data indicating success of said corresponding one of said received plurality of payload transmissions based on decision result.

Figure 9:
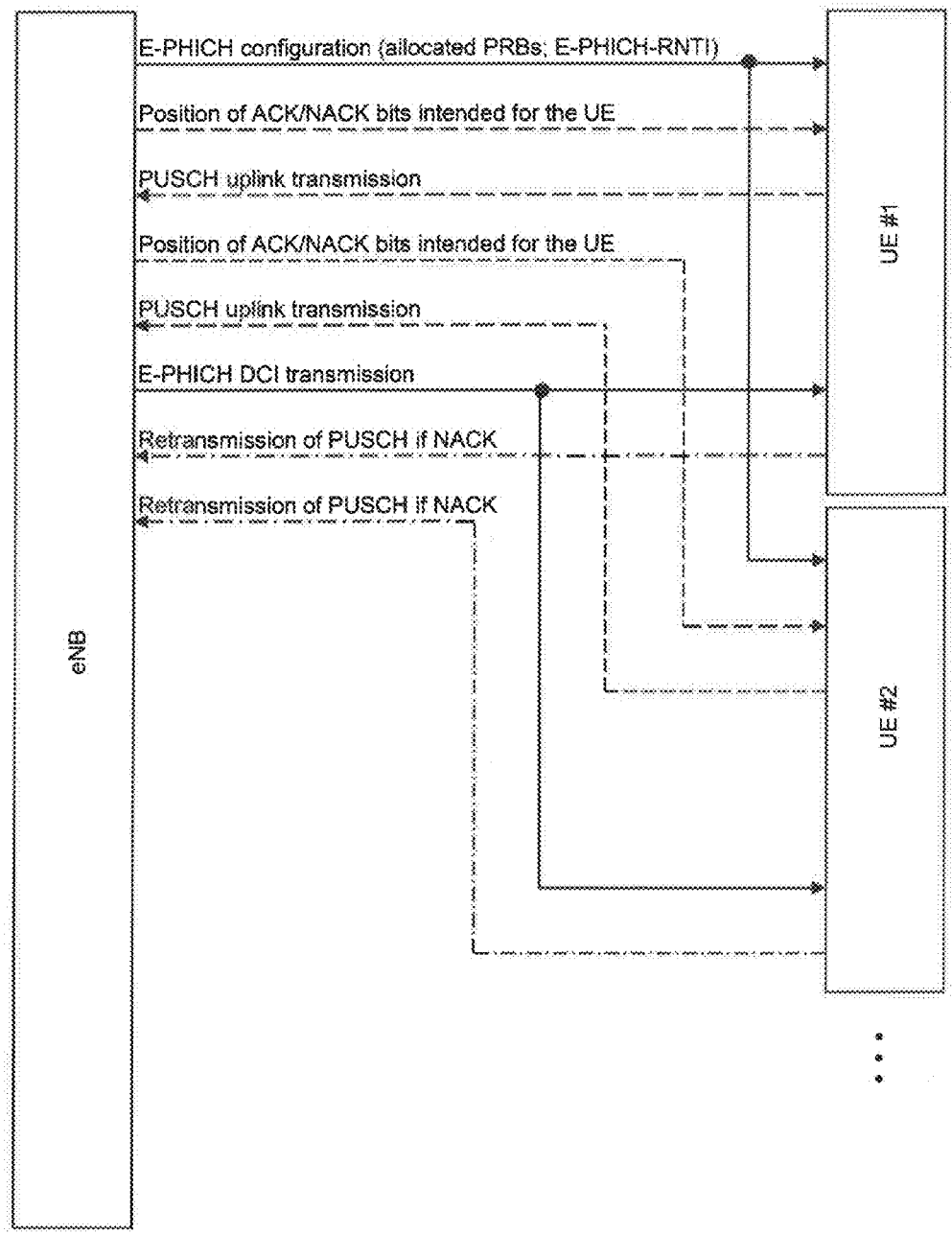
FIG. 9 shows exemplary signaling between an eNB and a plurality of UEs according to one aspect of the invention.

FIG. 9 illustrates exemplary signaling between an eNB and a plurality of UEs according to one aspect of the invention. In FIG. 9, an eNB and two UEs are shown, wherein said two UEs exemplarily signify a plurality of UEs. The eNB as shown in FIG. 9 corresponds to the eNB (11) as shown in FIG. 8. It is to be noted that also a plurality of eNBs may exist in parallel in the described scenario. Further, the UEs as shown in FIG. 9 correspond to the UE (1) as shown in FIG. 7.

In the following a possible signaling between the eNB and the UEs according to the invention is described.

First of all, a configuration message is transmitted by the eNB in a broadcast manner to all UEs which are connected to the eNB. Such configuration message contains at least information about the intended resources for transmission of the acknowledgement information and an identifier which serves as a scrambling key in later steps. The information about intended resources for transmission corresponds to a transmission resource announcement. Thus, e.g., physical resource blocks (PRB) allocated for the respective transmission are communicated to the receiving UEs. The identifier corresponds to a radio network temporary identifier (RNTI) for the E-PHICH, which is used to address messages provided with such E-PHICH-RNTI to the intended receivers.

It is noted that, alternatively, such configuration message can also be transmitted dedicated to a certain UE via dedicated control signaling.

Further, a position of ACK/NACK bit(s) in an E-PHICH transmission to be transmitted subsequently is communicated to at least one of the UEs. Thereby, for each of the UEs different positions of ACK/NACK bits are to be applied. Thus, such transmission is transmitted dedicated to certain UEs as implied in FIG. 9 by the separate signal ones for each UE.

It is to be noted that the position of ACK/NACK bit(s) in an E-PHICH transmission to be transmitted subsequently can also be conveyed to the specific UE implicitly by mapping the bit position e.g. to the information carried in the corresponding uplink grant. For example, similar implicit resource mapping mechanisms as in Release 8 PHICH can be used, i.e. mapping the bit position to the first PRB allocated in uplink for PUSCH and/or the DMRS cyclic shift allocated for the PUSCH transmission.

In the following, at least one of the involved UEs performs a PUSCH transmission to the eNB, that is, a (payload) data uplink transmission to the eNB. Such uplink transmission takes place in predefined resources, which are scheduled for the respective UE. Thus, such uplink transmission is to be granted and scheduled in advance.

Thereby, the grant message can be used to communicate the position of ACK/NACK bit(s) intended for the respective (granted) uplink transmission which is also known as implicit signaling. Such communication may be based for example on uplink PRB allocation or uplink demodulation reference signal (DM-RS) cyclic shift for the PUSCH transmission. For example, the bit position may be mapped to the first PRB allocated for uplink.

Subsequently, after receiving the at least one PUSCH transmission, the eNB determines respective ACK/NACK feedbacks, one for each TB of the received at least one PUSCH transmission, and merges the corresponding acknowledgement information items to a E-PHICH DCI format. Thereby, the positions as stated above describe portions within such E-PHICH DCI format to be transmitted. Thus, the eNB positions the acknowledgement information items intended for certain UEs according to the positions previously communicated to said certain UEs.

The thus formed DCI format is provided with the above stated RNTI and transmitted in a broadcast manner to the involved UEs.

Based on the communicated positions, which corresponds to the positions of acknowledgment data items in the DCI format, each UE is able to demerge the acknowledgement data items intended for the respective UE, and to assign the contained information (ACK/NACK) to the corresponding TB of the already performed PUSCH transmission. Thus, the UE can be informed whether transmission of one or multiple TBs associated to a PUSCH transmission succeeded or whether transmission of one or multiple TBs associated to a PUSCH transmission failed.

Consequently, each UE is able to retransmit, where appropriate, TBs of PUSCH transmissions which did not succeed.

Methods according to the present invention performed by the UEs and the eNB to achieve signaling as shown above are described in the following with reference to FIGS. 10 to 12.

Figure 10:
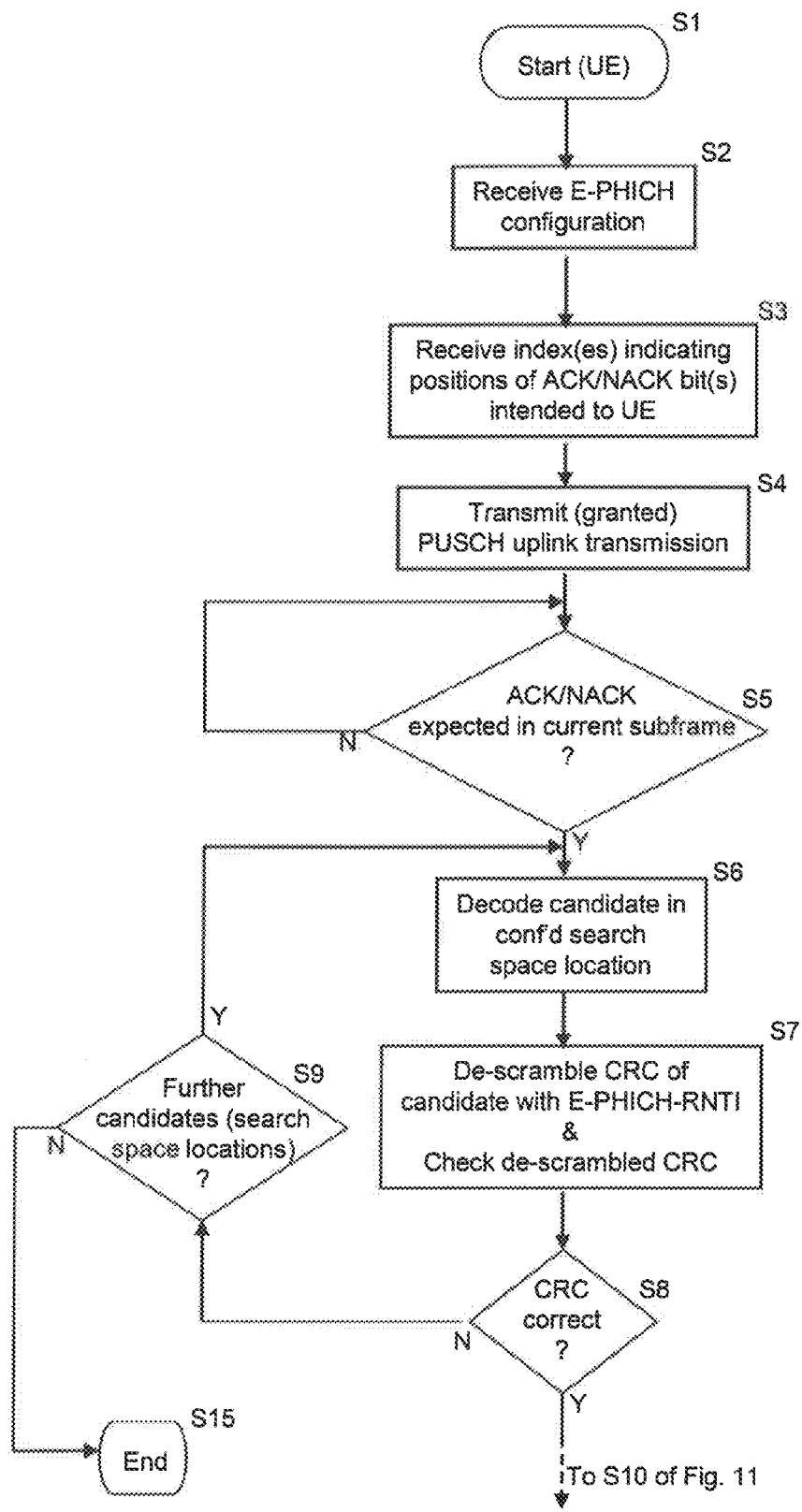
FIGS. 10 and 11 show exemplary method steps carried out by and implemented at the User Equipment side, UE side, according to one aspect of the invention.
Figure 11:
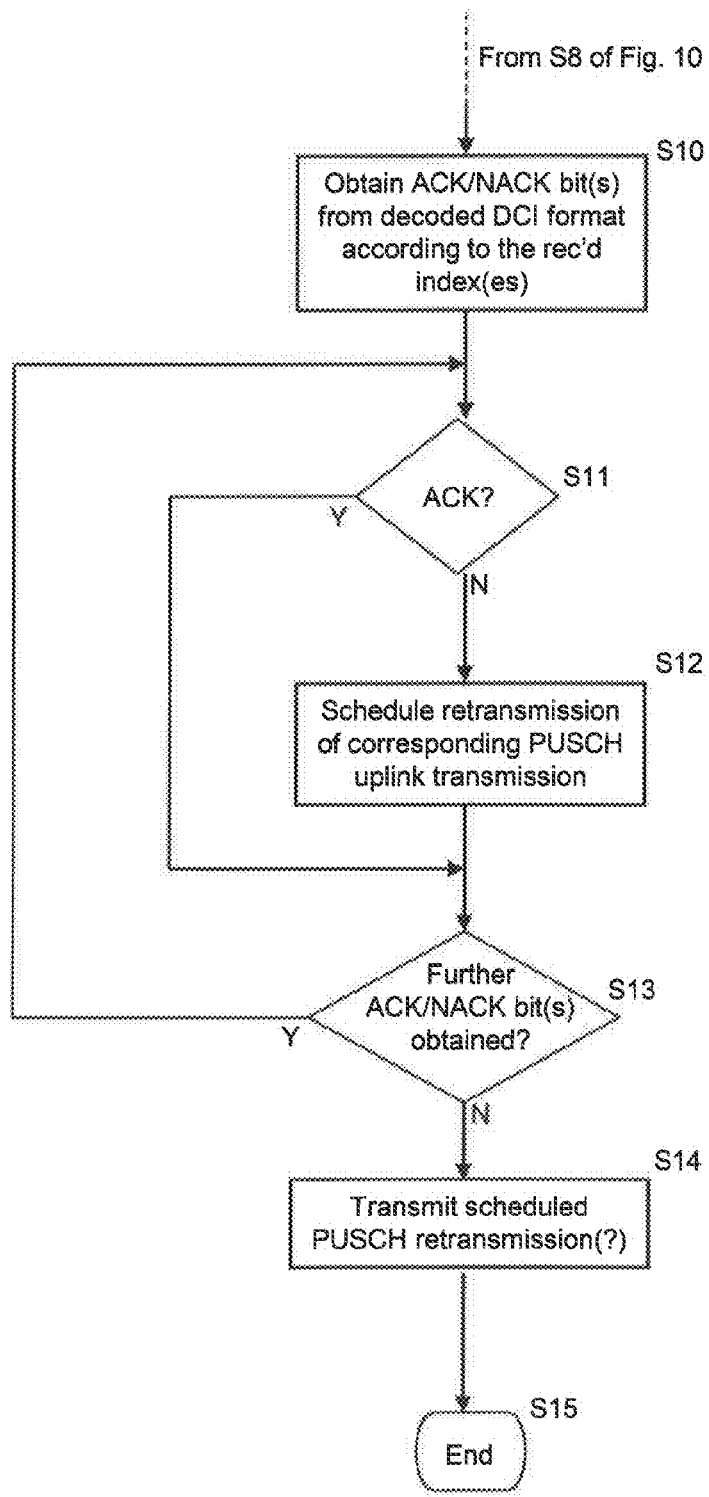

FIGS. 10 and 11 illustrate exemplary method steps carried out by and implemented at the User Equipment side, UE side, according to one aspect of the invention. The process starts with an initial step S1 at the UE. In the following step S2 an E-PHICH configuration is received, comprising at least information regarding scheduled resource blocks as well as the used RNTI.

In the following step S3, indexes are received or determined from implicit conveyance. Thereby, the indexes indicate portions in a scheduled DCI format, which are intended for the UE, that is, in which acknowledgment information items are scheduled to be located intended for the UE. Such index information may be received via higher layer transmissions. Further, such indexes may also be determined from implicit conveyance of the indexes, e.g. as part of uplink grant as stated already above.

Consequently, in a subsequent step S4, the granted PUSCH transmission is performed.

Related to such performed PUSCH transmission, the UE has to monitor for possible E-PHICH DCI formats only during certain subframes, since uplink HARQ is synchronous, that is, since the acknowledgment feedback with respect to an uplink transmission is driven in a predetermined and known time interval after the PUSCH transmission.

Thus, in a following step S5, it is checked whether in the current subframe E-PHICH DCI format intended for the UE is expected. If such E-PHICH DCI format is not expected in current subframe (No in step S5), the process returns to step S5 until a DCI format is expected in the current subframe.

If such E-PHICH DCI format is expected in current subframe (Yes in step S5), the process advances to step S6.

In the following steps S6 to S9, in configured search space locations it is monitored for E-PHICH DCI formats utilizing a blind decoding of the configured search space locations. Such configured search space locations are within the scheduled resource blocks for enhanced downlink control information. It is to be noted that, according to the present invention, the configured search space locations follow either localized or distributed resource mapping.

Here, monitoring comprises attempting to detect a DCI format by attempting to decode candidates from at least one search space location, descrambling the CRC with the configured E-PHICH-RNTI of the respective candidate and checking the correctness of the CRC.

It is to be noted that an E-PHICH DCI is assumed to be found whenever the check of CRC scrambled with the configured E-PHICH-RNTI is successful.

In step S6, the candidate is decoded from the respective search space location. In the following step S7, the decoded candidate and possible DCI format is descrambled using the configured E-PHICH-RNTI. In particular, the CRC portion of the candidate is descrambled using the configured E-PHICH-RNTI. Further, the CRC descrambled this way is checked against the payload bits contained in the DCI format.

Alternatively, in step S7 a CRC is computed over the payload bits of the decoded candidate and the computed CRC is then scrambled using the configured E-PHICH-RNTI. The newly computed and scrambled CRC is then checked against the scrambled CRC bits of the decoded candidate.

In the following step S8 it is checked whether descrambling of previous step S7 has been successful, that is whether the descrambled CRC is correct with respect to the payload bits contained in the DCI format.

Alternatively, if a CRC is newly computed and scrambled, the CRC is correct if the newly computed and scrambled CRC and the scrambled CRC bits of the decoded candidate are identical.

If descrambling has not been successful (No in step S8), the process advances to step S9. In step S9 it is checked whether further candidates in further search space locations can be decoded.

If no further candidates can be decoded (No in step S9), the process advances to step S15, which denotes the end step.

If further candidates can be decoded (Yes in step S9), the process returns to step S6 and decodes the further candidate from the further search space location.

Steps S6 to S9, in particular steps S7 and S8 are alternative implementations of the check whether the decoded candidate is an/the E-PHICH DCI to be searched for, that is, whether an/the E-PHICH DCI is detected. However, the check whether an/the E-PHICH DCI is detected is not limited to the proposed alternatives. Such check may also be performed by other appropriate implementations using CRC and/or E-PHICH-RNTI.

If descrambling has been successful, that is whether the CRC is correct (Yes in step S8), the process advances to step S10. In S10, ACK/NACK bit(s) intended for the UE are obtained from the decoded DCI format based on the received index(es).

As part of a loop, the following step S11 is performed for each of the obtained ACK/NACK bit(s). In step S11 it is checked whether the current ACK/NACK bit contains ACK (affirmative) information. If the current ACK/NACK bit does not contain ACK information (non-affirmative) (No in step S11), the process advances to step S12.

In step S12, retransmission of the already performed, corresponding PUSCH transmission is scheduled and the process advances to step S13.

If the current ACK/NACK bit contains ACK information (affirmative) (Yes in step S11), the process advances to step S13 without scheduling retransmission.

In step S13 it is checked whether further ACK/NACK bit(s) is/are obtained. If further ACK/NACK bit(s) is/are obtained (Yes in step S13), the process returns to step S11, where the next ACK/NACK bit is checked for ACK information.

If no further ACK/NACK bits are obtained (No in step S13), the process advances to step S14. In step S14, scheduled PUSCH retransmissions of the TBs corresponding to the obtained, non-affirmative ACK/NACK bits are performed and the process advances to step S15, which denotes the end step.

It is to be noted that for each transmission acknowledged by a received ACK bit, the corresponding HARQ process is suspended.

Figure 12:
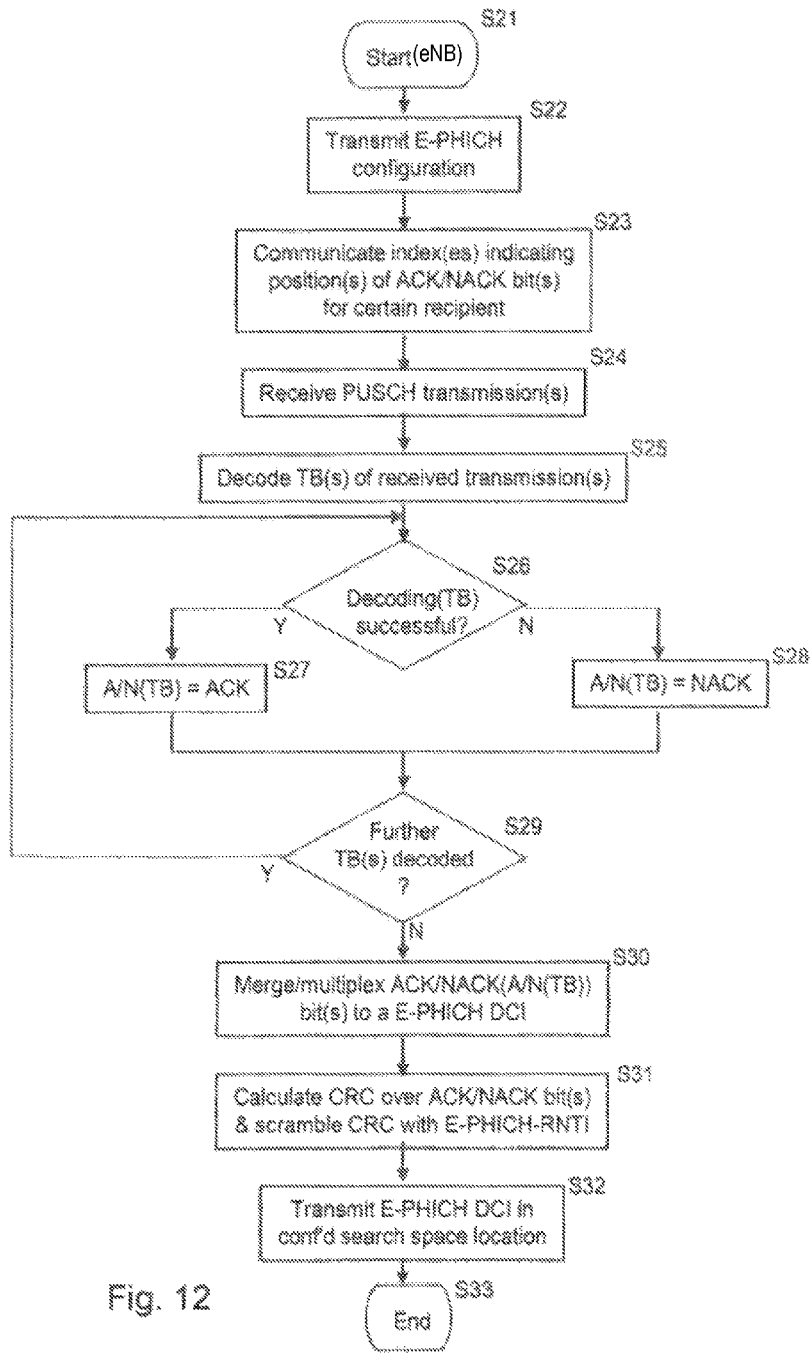
FIG. 12 shows exemplary method steps carried out by and implemented at the evolved Node B side, eNodeB side, according to one aspect of the invention.

FIG. 12 illustrates exemplary method steps carried out by and implemented at the evolved Node B side, eNodeB side, according to one aspect of the invention. The process starts with an initial step S21 at the eNB. In the following step S22 an E-PHICH configuration is transmitted, comprising at least information regarding scheduled resource blocks as well as the used RNTI. In the next step S23, index(es) indicating position(s) of ACK/NACK bit(s) for certain recipients are communicated. Such indexes may be communicated via explicit signaling, i.e. via a transmitted configuration message. It is to be noted that such transmission is a transmission dedicated to one receiver, wherein in each dedicated transmission index(es) intended for merely the certain receiver are contained. Such indexes may further be communicated via implicit signaling. For example the index can be mapped e.g. to the information carried in the corresponding uplink grant.

The process advances to step S24. In step S24, multiple PUSCH transmissions from multiple involved transmitters, that is, UEs, are received.

In a subsequent step S25, the TBs containing the received PUSCH transmissions are decoded and the process advances to step S26.

As part of a loop, the following step S26 is performed for each of the decoded TBs containing the received PUSCH transmissions. In step S26 it is checked whether decoding of the current has been successful. If decoding of the current has been successful (Yes in step S26), the process advances to step S27. In step S27, the acknowledgment state for the current TB is set to ACK (affirmative), and the process advances to step S29.

If decoding of the current has not been successful (No in step S26), the process advances to step S28. In step S28, the acknowledgment state for the current TB is set to NACK (non-affirmative), and the process advances to step S29.

In step S29 it is checked whether further TBs containing the received PUSCH transmissions are decoded. If further TBs containing the received PUSCH transmissions are decoded (Yes in step S29), the process returns to step S26, where checking of success of decoding of the next TB is performed.

If no further TBs containing the received PUSCH transmissions are decoded (No in step S29), the process advances to step S30.

In step S30, the set acknowledgment states are merged into an E-PHICH DCI. Such merging is performed in line with the ACK/NACK bit positions communicated to the individual involved UEs.

As a result, a DCI format wherein each position is allocated to a pair of an intended receiver and a corresponding TB of an already received PUSCH transmission is formed.

In the following step S31, a CRC is calculated over the merged ACK/NACK bits. In the following, the CRC is scrambled using the configured E-PHICH-RNTI, and the scrambled CRC is appended to the merged ACK/NACK bits.

In the following step S32, the formed DCI form at is transmitted using configured search space locations, that is, allocated and communicated resource blocks. It is to be noted that, according to the present invention, the configured search space locations follow either localized or distributed resource mapping. After that, the process advances to step S33, which denotes the end step.

According to the present invention, the E-PHICH allocation issue can be solved, since the E-PHICH resides within E-PDCCH resources. In particular, problems related to varying number of available REs for E-PHICH per subframe are avoided due to use of rate matching together with convolutional channel coding.

The implementation complexity can be kept low, since the proposed design according to the present invention with respect to DM-RS for demodulation relies on Rel-10 DM-RS for demodulation, which is the same as for E-PDCCH.

By implementing the proposed E-PHICH according to the present invention, E-PHICH overhead can scale to some extent with the amount of instantaneous ACK/NACK load.

Since the DC format size for E-PHICH is matched with other DCI sizes monitored by the UE (e.g. DCI Format 1A, 1C), complexity of the devices and load during operation incurred by blind decoding does not necessarily increase.

Generally, the invention is implemented in an environment such as LTE-Advanced system. Exemplary embodiments of the invention are represented by methods and/or correspondingly configured devices such as eNodeBs and/or UEs. More specifically, the invention generally relates to modem modules of such devices. Other systems can benefit also from the principles presented herein as long as they implement packet based transmission and channel quality control by means of packet-based acknowledgement information.

Embodiments of the present invention may be implemented in software, hardware, application logic or a combination of software, hardware and application logic. The software, application logic and/or hardware generally, but not exclusively, may reside on the devices' modem module. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention relates in particular but without limitation to mobile communications, for example to environments under 3G, 3.9G and 4G implementations and can advantageously be implemented in user equipments or smart phones, or personal computers connectable to such networks. That is, it can be implemented as/in chipsets to connected devices, and/or modems thereof.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes methods for devices, devices and computer program products for devices in relation to a communication module configured for packet based communication and comprising a receiving module and a transmission module. The receiving module is configured to receive a first transmission and a number indicative of a size of a subsequent second transmission. The device further comprises a control module. The control module is configured to estimate a signal to interference ratio based on said received first transmission, determine at least one of a modulation scheme and a code rate based on said signal to interference ratio and said received number, control transmission of at least one of said modulation scheme and said code rate, and to adjust settings of said receiving module to receive said second transmission based on at least one of said nodulation scheme and said code rate.

LIST OF ACRONYMS, ABBREVIATIONS AND DEFINITIONS

3GPP 3rd Generation Partnership Project
ACK/NACK acknowledgement/negative-acknowledgement
CA carrier aggregation
CCE control channel elements
CoMP coordinated multi-point transmission
CP cyclic prefix
CRC cyclic redundancy check
CRS common reference signals
CSI-RS channel state information reference signal
DCI downlink control information
DM RS demodulation reference signal
DwPTS downlink pilot timeslot
eICIC enhanced inter cell interference coordination
eNB evolved NodeB
E-PDCCH enhanced physical downlink control channel
E-PHICH enhanced physical HARQ indicator channel
E-PHICH-RNTI E-PHICH radio network temporary identifier
FDD frequency division duplex
FEC forward error correction
ICIC inter-cell interference coordination
ID identifier
HARQ hybrid automatic repeat request
LTE Long Term Evolution
LTE-A Long Term Evolution-Advanced
MBSFN multimedia broadcast single frequency network
MIMO multiple-input multiple-output
MTC machine type communication
MU multi-user
OFDM orthogonal frequency division multiplexing
PCFICH physical control format indicator channel
PDCCH physical downlink control channel
PDSCH physical shared channel
PHICH physical HARQ indicator channel
PRB physical resource blocks
RE resource element
REG resource element group
RNTI radio network temporary identifier
SFBC space-frequency block code
SFBC-FSTD space-frequency block code-frequency switched transmit diversity
TDD time division duplex
TPC transmit power control
UE user equipment
UE-RS UE-specific reference signals
UL uplink

What is claimed is:

1. A device, comprising:
a communication module, configured for packet based communication, and comprising a receiving module, wherein said receiving module is configured to receive a control message and at least one index, wherein said control message includes a plurality of acknowledgement information items for a plurality of devices, each of said plurality of acknowledgement information items being respectively located in a preset portion of said control message corresponding to said at least one index,
a determination module, configured to determine whether said received control message is for at least said device, by decoding, responsive to determining that said control message is received in a predetermined time interval after an uplink transmission, said received control message in at least one configured search space location to detect a downlink control information format, and checking correctness of a cyclic redundancy check (CRC) portion of said downlink control information format using payload bits in said downlink control information format,
a selection module, configured to select, responsive to determining that said received control message is for at least said device, at least one acknowledgement information item comprising a subset of said plurality of acknowledgement information items included for said device, and
an obtaining module, configured to obtain control data contained in said selected at least one of said plurality of acknowledgement information items.

2. The device according to claim 1, wherein said determination module is configured to check correctness of said CRC portion of the downlink control information format using said payload bits and an identifier included in a first configuration message received by said receiving module, said identifier comprising a radio network temporary identifier (RNTI) and indicating recipient of said control message.

3. The device according to claim 1, wherein
said receiving module is configured to receive a first configuration message,
wherein said first configuration message includes a transmission resource announcement indicating an allocated transmission resource scheduled for said control message; and
said receiving module is configured to receive said control message by monitoring a portion in time-frequency-domain corresponding to said transmission resource announcement included in said received first configuration message.

4. The device according to claim 1, wherein message; and
said receiving module is configured to receive a configuration message, wherein said configuration message implicitly includes said at least one index indicating a position corresponding to said preset portions of said control message for said device.

5. The device according to claim 1, wherein said selection module is configured to perform said selection based on said at least one index.

6. The device according to claim 1, further comprising: a control module, configured to decide whether said payload transmission succeeded based on said corresponding control data contained in said selected acknowledgement information items, and to control responsive to negative decision result, re-transmission of said payload transmission.

7. A device, comprising:
a communication module, configured for packet based communication, and comprising a transmission module, wherein said transmission module is configured to transmit a control message and at least one index to a plurality of recipient devices, wherein said control message includes a plurality of acknowledgement information items each for a respective one of said plurality of recipient devices, each of said plurality of acknowledgement information items being located in a different preset portion of said control message corresponding to said at least one index, respectively, said communication module configured to transmit said control message in a predetermined time interval after an uplink transmission to be valid for each of said plurality of recipient devices, said control message decodable to obtain a downlink control information format that includes a cyclic redundancy check (CRC) portion and payload bits with which to check correctness of the CRC portion.

8. The device according to claim 7, wherein at least one of:
said communication module further comprises a receiving module, configured to receive a plurality of payload transmissions, wherein each of said acknowledgement information items contains control data indicating success of a corresponding one of said received plurality of payload transmissions;
said transmission module is configured to transmit a first configuration message, wherein said first configuration message includes a transmission resource announcement indicating an allocated transmission resource scheduled for said control message; and
said transmission module is configured to transmit said control message using a portion in time-frequency-domain corresponding to said transmission resource announcement included in said transmitted first configuration message.

9. The device according to claim 7, wherein said transmission module is configured to transmit a first configuration message that includes an identifier indicating a recipient device of said control message, said recipient device from said plurality of recipient devices, the device further comprising
a control module, configured to scramble at least a portion of said control message using said identifier included in said transmitted first configuration message.

10. The device according to claim 7, wherein
said transmission module is configured to transmit a configuration message, wherein said configuration message implicitly includes said at least one index indicating a position corresponding to said preset portions of said control message for said recipient devices.

11. The device according to claim 7, wherein
said transmission module is configured to position each of said acknowledgement items in said control message based on said at least one index and a received corresponding payload transmission.

12. The device according to claim 7, further comprising:
a decision module, configured to:
decode a plurality of received payload transmissions, decide whether decoding succeeded, and
set said control data indicating success of said corresponding one of said received plurality of payload transmissions based on decision result.

13. A method for a device comprising a communication module, configured for packet based communication, said method comprising the steps of:
receiving a control message and at least one index, wherein said control message includes a plurality of acknowledgement information items, each of said plurality of acknowledgement information items being located in a preset portion of said control message corresponding to said at least one index, respectively,
determining whether said received control message is for said device, by decoding, responsive to determining that the control message is received in a predetermined time interval after an uplink transmission, the received control message in at least one configured search space location to detect a downlink control information format, and checking correctness of a cyclic redundancy check (CRC) portion of the downlink control information format using payload bits in the downlink control information format,
selecting, responsive to determining that said received control message is for said device, at least one acknowledgement information item comprising a subset of said plurality of acknowledgement information items included for said device, and
obtaining control data contained in said selected at least one of said plurality of acknowledgement information items.

14. The method according to claim 13, further comprising
receiving a first configuration message, wherein said first configuration message includes a transmission resource announcement indicating an allocated transmission resource scheduled for said control message; and
in relation to said receiving said control message, monitoring a portion in time-frequency-domain corresponding to said transmission resource announcement included in said received first configuration message.

15. The method according to claim 13, further comprising
receiving a configuration message, wherein said configuration message implicitly includes said at least one index indicating a position corresponding to said preset portions of said control message for said device.

16. The method according to claim 13, comprising:
receiving a first configuration message; and
checking the correctness of said CRC portion of said downlink control information format using said payload bits and an identifier included in said received first configuration message, the identifier comprising a radio network temporary identifier (RNTI) and indicating recipient of said control message.

17. The method according to claim 13, further comprising:
deciding whether said payload transmission succeeded based on said corresponding control data contained in said selected acknowledgement information items, and
controlling, responsive to negative decision result, re-transmission of said payload transmission.

18. A method for a device comprising a communication module, configured for packet based communication, said method comprising the steps of:

transmitting a control message and at least one index to a plurality of recipient devices, wherein said control message includes a plurality of acknowledgement information items each for a respective one of said plurality of recipient devices, each of said plurality of acknowledgement information items being located in a different preset portion of said control message corresponding to said at least one index, respectively, said control message transmitted in a predetermined time interval after an uplink transmission to be valid for each of said plurality of recipient devices, said control message decodable to obtain a downlink control information format that includes a cyclic redundancy check (CRC) portion and payload bits with which to check correctness of the CRC portion.

19. The method according to claim 18, further comprising at least one of:
receiving a plurality of payload transmissions, wherein each of said acknowledgement information items contains control data indicating success of a corresponding one of said received plurality of payload transmissions; and
transmitting a first configuration message, wherein said configuration message includes a transmission resource announcement indicating an allocated transmission resource scheduled for said control message.

20. The method according to claim 18, further comprising:
transmitting a first configuration message that includes an identifier indicating a recipient device of said control message, said recipient device from said plurality of recipient devices; and
scrambling at least a portion of said control message using said identifier included in said transmitted first configuration message.

21. The method according to claim 18, further comprising:
transmitting a configuration message, wherein said configuration message implicitly includes at least one index indicating a position corresponding to said preset portions of said control message for said recipient device; and
positioning each of said acknowledgement items in said control message based on said at least one index included in said transmitted configuration message and a received corresponding payload transmission.

22. The method according to claim 18, further comprising:
decoding a plurality of received payload transmissions, deciding whether decoding succeeded, and
setting said control data indicating success of said corresponding one of said received plurality of payload transmissions based on deciding result.

23. A non-transitory computer readable memory tangibly storing a computer program executed by a device comprising a communication module, configured for packet based communication, said computer program comprising computer-executable components which, when executed on a device, causes the device to:
receive a control message and at least one index, wherein said control message includes a plurality of acknowledgement information items, each of said plurality of acknowledgement information items being respectively located in a preset portion of said control message corresponding to said at least one index,
determine whether said received control message is for said device, by decoding, responsive to determining that said control message is received in a predetermined time interval after an uplink transmission, said received control message in at least one configured search space location to detect a downlink control information format, and checking correctness of a cyclic redundancy check (CRC) portion of said downlink control information format using payload bits in said downlink control information format,
select, responsive to determining that said received control message is for said device, at least one acknowledgement information item comprising a subset of said plurality of acknowledgement information items included for said device, and
obtain control data contained in said selected at least one of said plurality of acknowledgement information items.

24. A non-transitory computer readable memory tangibly storing a computer program executable by a device comprising a communication module, configured for packet based communication, said computer program comprising computer-executable components which, when executed on a device, causes the device to:
transmit a control message and at least one index, wherein said control message includes a plurality of acknowledgement information items, each of said plurality of acknowledgement information items being located in a preset portion of said control message corresponding to said at least one index, respectively, said control message transmitted in a predetermined time interval after an uplink transmission to be valid for each of said plurality of recipient devices, said control message decodable to obtain a downlink control information format that includes a cyclic redundancy check (CRC) portion and payload bits with which to check correctness of the CRC portion.

* * * * *

UNITED STATES PATENT AND TRADEMARK OFFICE
CERTIFICATE OF CORRECTION

PATENT NO. : 9,078,250 B2  
APPLICATION NO. : 13/752656  
DATED : July 7, 2015  
INVENTOR(S) : Tommi Tapani Koivisto, Timo Eric Roman and Mihai Horatiu Enescu Page 1 of 1

It is certified that error appears in the above-identified patent and that said Letters Patent is hereby corrected as shown below:

In the claims;

*Please replace column 18, line 64, Claim 4 with the following corrected version:*

-- 4. The device according to claim 1, wherein --

Signed and Sealed this  
Fifteenth Day of March, 2016

Michelle K. Lee  
*Director of the United States Patent and Trademark Office*